UNITED STATES PATENT OFFICE.

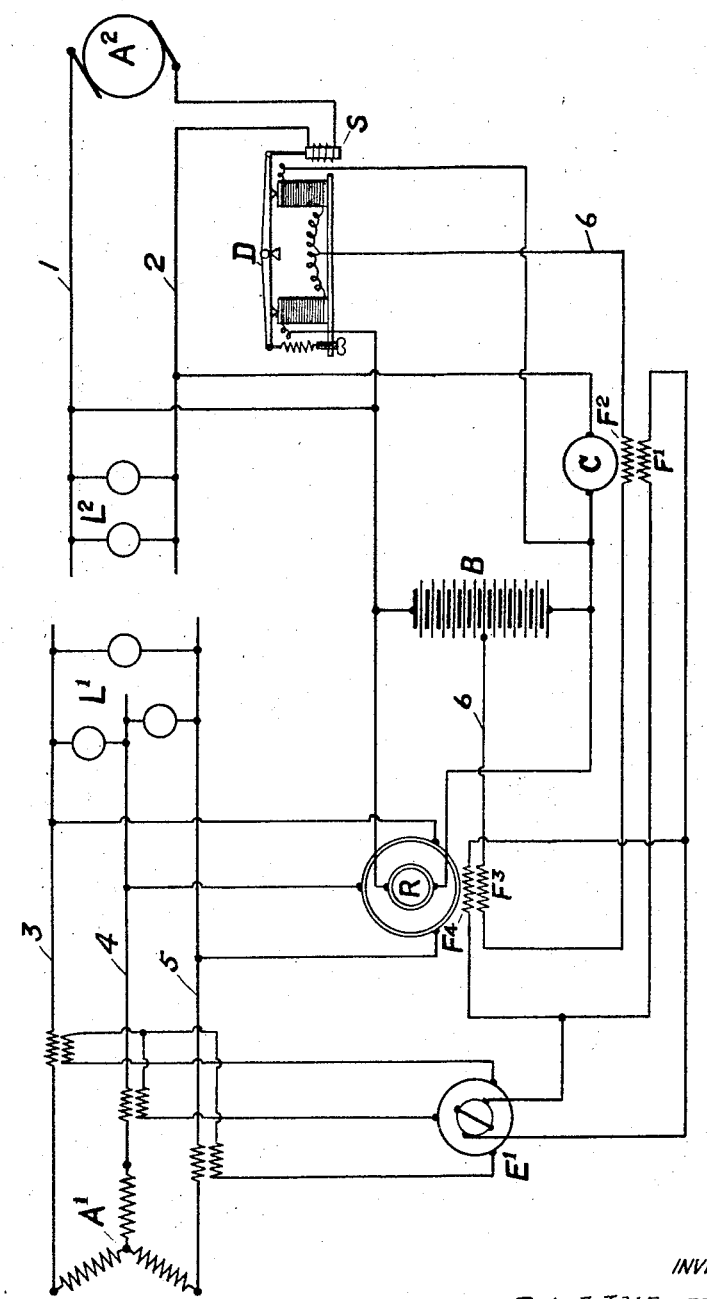

JOSEPH L. WOODBRIDGE, OF PHILADELPHIA, PENNSYLVANIA.

SYSTEM OF ELECTRICAL DISTRIBUTION.

1,014,354.   Specification of Letters Patent.   Patented Jan. 9, 1912.

Application filed December 6, 1909. Serial No. 531,616.

*To all whom it may concern:*

Be it known that I, JOSEPH L. WOODBRIDGE, a citizen of the United States, and a resident of Philadelphia, in the county of Philadelphia and State of Pennsylvania, have invented a certain new and useful System of Electrical Distribution, of which the following is a specification.

This invention relates to systems of distribution in which two different sources of electric energy are supplying power to two independent consumption circuits, either or both of which may have a fluctuating load, and in which one storage battery is arranged to regulate the fluctuations on either circuit. In some systems of this kind regulating apparatus has been inserted between the battery and each of the circuits whose load is to be regulated, each of these arrangements of regulating apparatus being directly responsive to variations of load on the particular circuit which it is intended to regulate but not directly responsive to fluctuations of load on the other circuit. The inter-connection between the two circuits may permit fluctuations of load on one to be felt to a greater or less extent on the other and in such case the regulating apparatus which is responsive to the fluctuations on the second circuit will respond to cause the battery to partially compensate for them. In the present invention I provide separate regulating apparatus for controlling the operation of the battery in connection with each circuit, but each of these pieces of regulating apparatus is made responsive to fluctuations of load on both circuits in such a way that when a variation of load occurs on one circuit the apparatus for regulating the charge and discharge of the battery in connection with that circuit is caused to act upon the battery to relieve that circuit of the load fluctuation and at the same time the regulating apparatus for controlling the operation of the battery on the other circuit responds directly to the fluctuation of load on the first circuit to prevent the effect of this fluctuation from being felt on the second circuit. This and other objects of the invention will be more clearly seen by reference to the accompanying diagram in which—

$A^1$ is a source of electrical energy of one kind, as for example, three phase alternating current connected to the circuit 3—4—5, while $A^2$ is a source of electrical energy of another kind, as for example direct current, and is connected to the circuit 1—2. The load on these two circuits is represented at $L^1$ and $L^2$ respectively. A battery B is connected across the circuit 1—2 with a booster C in series between one terminal of the battery and the conductor 2. Between the battery and the alternating current circuit is shown a suitable transforming device R, which may be a rotary converter or a motor generator.

At D is shown a carbon regulator, a well known device, consisting of two piles of carbon disks connected in series across the terminals of the battery, the pressure on the two piles being varied by means of a lever controlled by a solenoid S connected into the conductor 2 and carrying current proportional to the output of the generator $A^2$. From the middle point of the circuit between the two carbon piles is a connection by way of conductor 6 to the middle point of the battery B, into which are connected in series two field windings, one of which $F^2$ affects the voltage of the booster C to cause the battery to charge and discharge on the direct current circuit 1—2, while the other field winding $F^3$ affects the transforming apparatus R in such a way as to counteract the effect of varying voltage across the battery terminals resulting from the action of the field winding $F^4$.

At $E^1$ is shown an exciter connected to the alternating current circuit 3—4—5, in such a way as to respond to fluctuations of load on this circuit. This exciter may be of the type described in Patent #870,150 issued to me under date of November 5th, 1907, or it may be made to respond to changes of condition on the alternating current circuit in any of the various ways well known to the art. This exciter supplies current for exciting the field winding $F^4$ of the transforming apparatus R, and also for exciting the field winding $F^1$ of the booster C, these two field windings as shown being connected in parallel. The action of this exciter is in general similar to that already described in connection with the carbon regulator D. A small increase of load on the source $A^1$ will vary the excitation of the field winding $F^4$ to cause the battery to charge or discharge to compensate for the fluctuation of load on the alternating current circuit. At the same time the change of excitation in field winding $F^1$ will vary the booster voltage to prevent the resulting change in battery voltage from being felt or causing a disturbance on the circuit 1—2. The operation of the apparatus will then be as follows: If an increase of load occurs at $L^2$, a small part of this increase passing through the solenoid S will vary the pressure on the carbon piles of the carbon regulator D and cause a flow of current in the booster field $F^2$, producing a booster voltage suitable for causing the battery B to discharge and relieve the circuit 1—2 of the greater part of the increase of load. This discharge will cause the battery voltage to drop and would ordinarily tend to produce a flow of current from the source $A^1$ through the transforming apparatus R, thus increasing the load on the source $A^1$. This increase of load would bring the exciter $E^1$ into operation, modifying the action of the transforming apparatus R by a change of current in the field winding $F^4$ so as to partially prevent the disturbance from reaching the circuit 3—4—5; but with the apparatus as shown the change of current in the field winding $F^3$ which occurs simultaneously with that in the field winding $F^2$ will produce the desired effect on the transforming apparatus R and wholly prevent the disturbance from reaching the circuit 3—4—5 if the apparatus is properly designed. It will thus be seen that each field regulating device controls the fields of both battery controlling apparatus to take care of the load fluctuations on its own circuit.

If the load at $L^1$ is not a fluctuating load the exciter $E^1$ and the two field windings $F^4$ and $F^1$ could be omitted and the transforming apparatus R could be utilized to transmit a constant amount of energy between the two circuits in either direction. In this case the field winding $F^3$ by its effect on the transforming apparatus R would prevent fluctuations of battery voltage, due to its charge and discharge in regulating the load on the circuit 1—2 from causing a disturbance on the circuit 3—4—5. Without this field winding $F^3$ the exciter $E^1$ and the field coil $F^4$ or some equivalent would be necessary to compensate for the effect of fluctuations of battery voltage even though the load $L^1$ were absolutely constant.

It will be obvious that modifications may be made in the details of the apparatus without departing from the spirit of the invention.

What I claim therefore and desire to secure by Letters Patent is,

1. In combination two independent electric circuits, a storage battery operatively arranged with respect to both circuits, independent means for controlling the transfer of energy between each circuit and the battery, and a regulating device responsive to changes of electrical condition on one of the circuits and adapted to regulate the operation of both controlling means.

2. In combination two independent electric circuits, a storage battery operatively arranged with respect to both circuits, and a regulating device responsive to changes of electrical condition on one of the circuits and adapted to control the charge and discharge of the battery with respect to that circuit and simultaneously to neutralize the effect on the other circuit of said charge and discharge.

3. In combination two independent electric circuits, a storage battery operatively arranged with respect to both circuits, a field coil for controlling the operation of the battery in respect to one of the circuits, another field coil for controlling the operation of the battery with respect to the other circuit, and a device responsive to the electrical condition of one of the circuits for simultaneously varying the current in both coils.

4. In combination two independent electric circuits, a separate source of electrical energy for each circuit, a storage battery operatively arranged with respect to both circuits, independent means for controlling the transfer of energy between each circuit and the battery, and a regulating device responsive to changes of electrical condition on one of the circuits and adapted to regulate the operation of both controlling means.

5. In combination two independent electric circuits, a separate source of electrical energy for each circuit, a storage battery operatively arranged with respect to both circuits, and a regulating device responsive to changes of electrical condition on one of the circuits and adapted to control the charge and discharge of the battery with respect to that circuit and simultaneously to neutralize the effect on the other circuit of said charge and discharge.

6. In combination two independent electric circuits, a separate source of electrical energy for each circuit, a storage battery operatively arranged with respect to both circuits, a field coil for controlling the operation of the battery in respect to one of the circuits, another field coil for controlling the operation of the battery with respect to the other circuit, and a device responsive to the electrical condition of one of the circuits for simultaneously varying the current in both coils.

7. In combination an alternating current circuit, a direct current circuit, a storage battery, connections for transmitting energy between the battery and each of said circuits, independent means for controlling said transfer of energy to and from each circuit, and a regulating device responsive to changes of electrical condition on one of the circuits and adapted to regulate the operation of both controlling means.

8. In combination an alternating current circuit, a direct current circuit, a storage battery, connections for transmitting energy between the battery and each of said circuits, and a regulating device responsive to changes of electrical condition on one of said circuits and adapted to control the charge and discharge of the battery with respect to that circuit and simultaneously to neutralize the effect on the other circuit of said charge and discharge.

9. In combination an alternating current circuit, and its source, a direct current circuit and its source, a storage battery, connections for transmitting energy between the battery and each of said circuits, independent means for controlling said transfer of energy to and from each circuit, and a regulating device responsive to changes of electrical condition on one of the circuits and adapted to regulate the operation of both controlling means.

10. In combination an alternating current circuit, and its source, a direct current circuit and its source, a storage battery, connections for transmitting energy between the battery and each of said circuits, and a regulating device responsive to changes of electrical condition on one of said circuits and adapted to control the charge and discharge of the battery with respect to that circuit and simultaneously to neutralize the effect on the other circuit of said charge and discharge.

11. In combination an alternating current circuit, a direct current circuit, a storage battery, connections for transmitting energy between the battery and each of said circuits, a field coil for controlling the operation of the battery in resept to the alternating current circuit, another field coil for controlling the operation of the battery in respect to the direct current circuit, and a device responsive to the electrical condition of one of the circuits for simultaneously varying the current in both coils.

12. In combination an alternating current circuit and its source, a direct current circuit and its source, a storage battery, connections for transmitting energy between the battery and each of said circuits, a field coil for controlling the operation of the battery in respect to the alternating current circuit, another field coil for controlling the operation of the battery in respect to the direct current circuit, and a device responsive to the electrical condition of one of the circuits for simultaneously varying the current in both coils.

13. In combination two independent electric circuits, a separate source of electrical energy for each circuit, a storage battery operatively arranged with respect to both circuits, independent means for controlling the transfer of energy between each circuit and the battery, and a regulating device responsive to changes of load on one of the sources and adapted to regulate the operation of both controlling means.

14. In combination two independent electric circuits, a separate source of electrical energy for each circuit, a storage battery operatively arranged with respect to both circuits, and a regulating device responsive to changes of load on one of the sources and adapted to control the charge and discharge of the battery with respect to the circuit supplied by that source and simultaneously to neutralize the effect on the other circuit of said charge and discharge.

15. In combination two independent electric circuits, a separate source of electrical energy for each circuit, a storage battery operatively arranged with respect to both circuits, a field coil for controlling the operation of the battery in respect to one of the circuits, another field coil for controlling the operation of the battery with respect to the other circuit, and a device responsive to changes of load on one of the sources for simultaneously varying the current in both coils.

In testimony whereof I have hereunto signed my name.

JOSEPH L. WOODBRIDGE.

Witnesses:
    FRANK E. FRENCH,
    A. B. SLOUGHTON.